US012766981B2

(12) United States Patent
Kato

(10) Patent No.: US 12,766,981 B2
(45) Date of Patent: Oct. 20, 2026

(54) ELECTRIC VEHICLE

(71) Applicant: SUBARU CORPORATION, Tokyo (JP)

(72) Inventor: Masaaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 147 days.

(21) Appl. No.: 18/853,784

(22) PCT Filed: Jul. 31, 2023

(86) PCT No.: PCT/JP2023/027921

§ 371 (c)(1),
(2) Date: Oct. 3, 2024

(87) PCT Pub. No.: WO2025/027737

PCT Pub. Date: Feb. 6, 2025

(65) Prior Publication Data

US 2026/0167020 A1 Jun. 18, 2026

(51) Int. Cl.
*B60L 53/14* (2019.01)
*B60L 50/16* (2019.01)
(Continued)

(52) U.S. Cl.
CPC ............... *B60L 50/16* (2019.02); *B60L 50/40* (2019.02); *B60L 50/51* (2019.02); *B60L 53/14* (2019.02);
(Continued)

(58) Field of Classification Search
CPC .......... B60L 50/16; B60L 50/40; B60L 50/51; B60L 53/14; B60W 10/08; B60W 10/18
See application file for complete search history.

(56) References Cited

U.S. PATENT DOCUMENTS 7,441,615 B2 * 10/2008 Borroni-Bird ......... B62D 21/10 180/402
9,931,936 B2 * 4/2018 Bruce ....................... B60L 1/00
(Continued)

FOREIGN PATENT DOCUMENTS

JP 2007-274804 A 10/2007
JP 2009-143432 A 7/2009
(Continued)

OTHER PUBLICATIONS

International Search Report dated Oct. 3, 2023, from corresponding International Application No. PCT/JP2023/027921 (non-English).
(Continued)

*Primary Examiner* — Tyler J Lee
(74) *Attorney, Agent, or Firm* — Rimon P.C.

(57) ABSTRACT

An electric vehicle includes an electric motor, a power storage body, a power receiver, a charger, and a control system. The electric motor is coupled to a wheel. The power storage body is coupled to the electric motor. The power receiver receives electric power from an external power source. The charger is coupled to the power receiver and the power storage body. The control system controls the electric motor. The electric vehicle has traveling modes including a first traveling mode, and a second traveling mode in which regenerative electric power upon vehicle braking is smaller than that in the first traveling mode. The control system executes the first traveling mode in a non-power-supply time in which the charger is deactivated, and executes the second traveling mode in a power-supply time in which the charger is activated.

13 Claims, 10 Drawing Sheets

(51) Int. Cl.

| | |
|---|---|
| ***B60L 50/40*** | (2019.01) |
| ***B60L 50/51*** | (2019.01) |
| ***B60W 10/08*** | (2006.01) |
| ***B60W 10/18*** | (2012.01) |

(52) U.S. Cl.

CPC ............ *B60W 10/08* (2013.01); *B60W 10/18* (2013.01); *B60L 2240/12* (2013.01); *B60L 2240/421* (2013.01); *B60L 2240/423* (2013.01); *B60L 2240/545* (2013.01)

(56) References Cited

U.S. PATENT DOCUMENTS

| | | | | |
|---|---|---|---|---|
| 10,603,997 | B2 * | 3/2020 | Bergstrom | B60G 3/08 |
| 10,759,295 | B2 * | 9/2020 | Homedes Pedret | B60L 53/16 |
| 12,434,576 | B2 * | 10/2025 | Ito | B60L 53/00 |
| 2005/0039630 | A1 * | 2/2005 | Kumar | B60K 6/46 105/35 |
| 2008/0156553 | A1 * | 7/2008 | Hoogenraad | B60W 20/00 701/99 |
| 2009/0138149 | A1 * | 5/2009 | Chattot | B60L 5/42 320/128 |
| 2010/0292882 | A1 | 11/2010 | Murata | |
| 2012/0316717 | A1 * | 12/2012 | Daum | B60L 55/00 701/22 |
| 2015/0324798 | A1 * | 11/2015 | Kai | G06Q 20/145 705/40 |
| 2015/0326062 | A1 * | 11/2015 | Gonzalez Valdez | H02J 50/10 320/108 |
| 2016/0114683 | A1 | 4/2016 | Bruce | |
| 2016/0207418 | A1 * | 7/2016 | Bergstrom | B60G 3/08 |
| 2017/0008400 | A1 | 1/2017 | Katsuta | |
| 2017/0129342 | A1 | 5/2017 | Tajima et al. | |
| 2018/0345794 | A1 | 12/2018 | Öhman et al. | |
| 2019/0315243 | A1 | 10/2019 | Kodera et al. | |
| 2020/0122726 | A1 * | 4/2020 | Tokura | G08G 1/017 |
| 2020/0238849 | A1 * | 7/2020 | Kusada | B60W 50/14 |
| 2020/0284841 | A1 * | 9/2020 | Moon | G01R 31/364 |
| 2022/0135034 | A1 * | 5/2022 | Ito | G08G 1/087 701/70 |
| 2022/0140621 | A1 * | 5/2022 | Kwon | H02J 7/56 320/117 |
| 2022/0234453 | A1 * | 7/2022 | Ito | B60L 53/00 |

FOREIGN PATENT DOCUMENTS

| | | | |
|---|---|---|---|
| JP | 2011-166877 | A | 8/2011 |
| JP | 2015-143073 | A | 8/2015 |
| JP | 2016-522666 | A | 7/2016 |
| JP | 2019-506114 | A | 2/2019 |
| JP | 2021-083143 | A | 5/2021 |
| JP | 2021-192583 | A | 12/2021 |
| JP | 2023-011286 | A | 1/2023 |
| WO | 2011/135870 | A1 | 11/2011 |
| WO | 2015/146393 | A1 | 10/2015 |

OTHER PUBLICATIONS

Office Action dated Apr. 21, 2026, issued in corresponding Japanese Application No. JP2025-538074.

* cited by examiner

[FIG. 1]
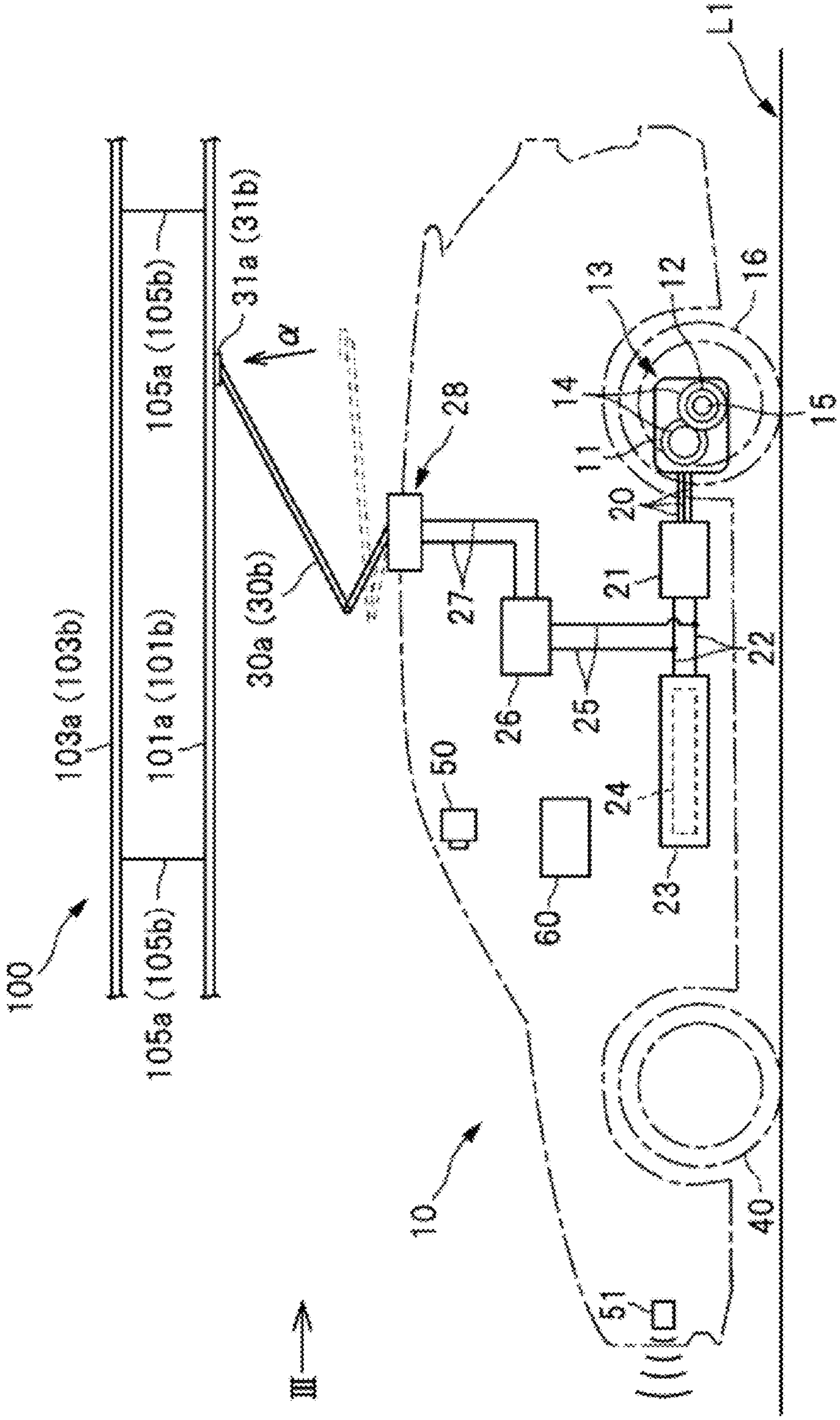

[FIG. 2]
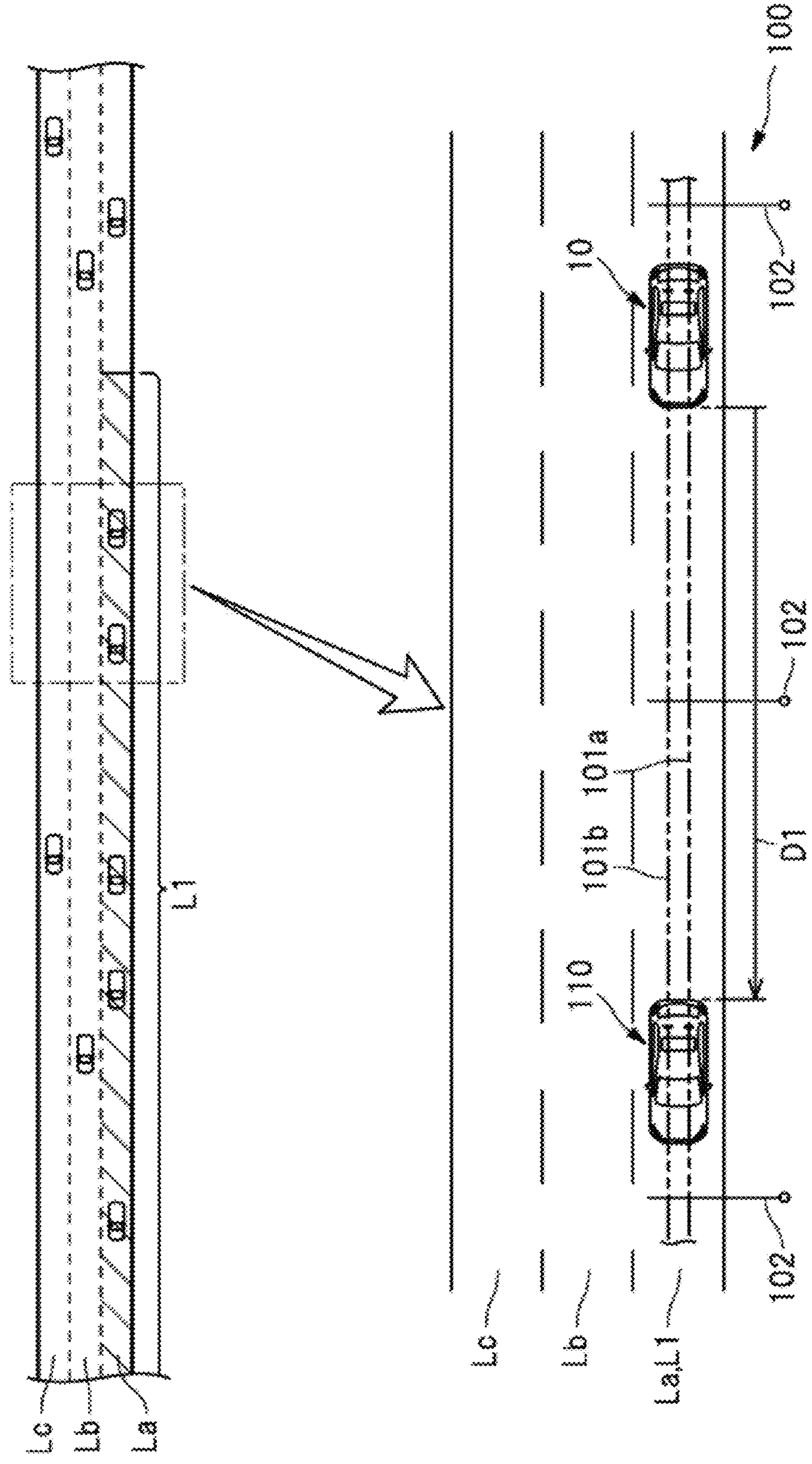

[FIG. 3]
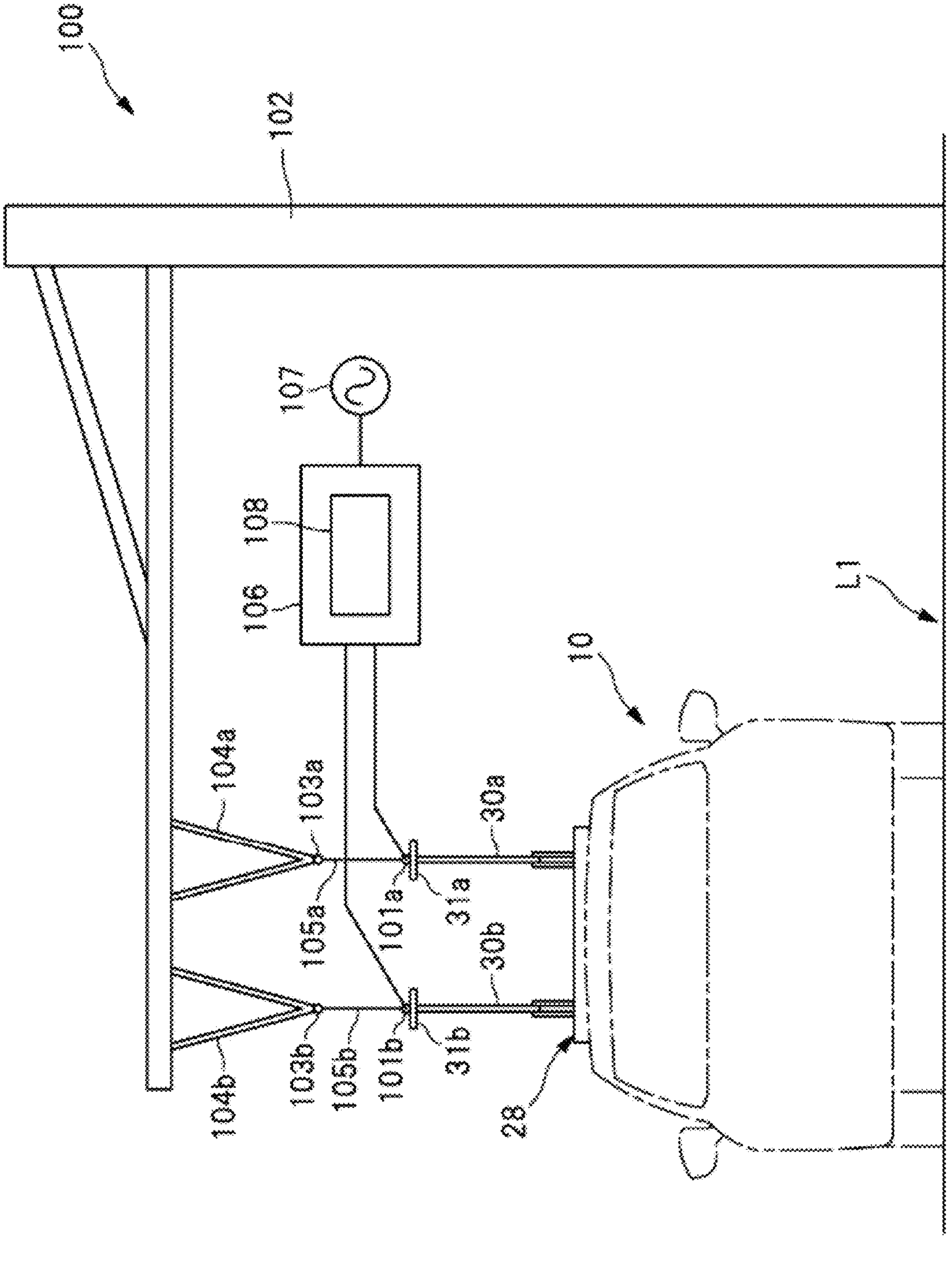

[FIG. 4]
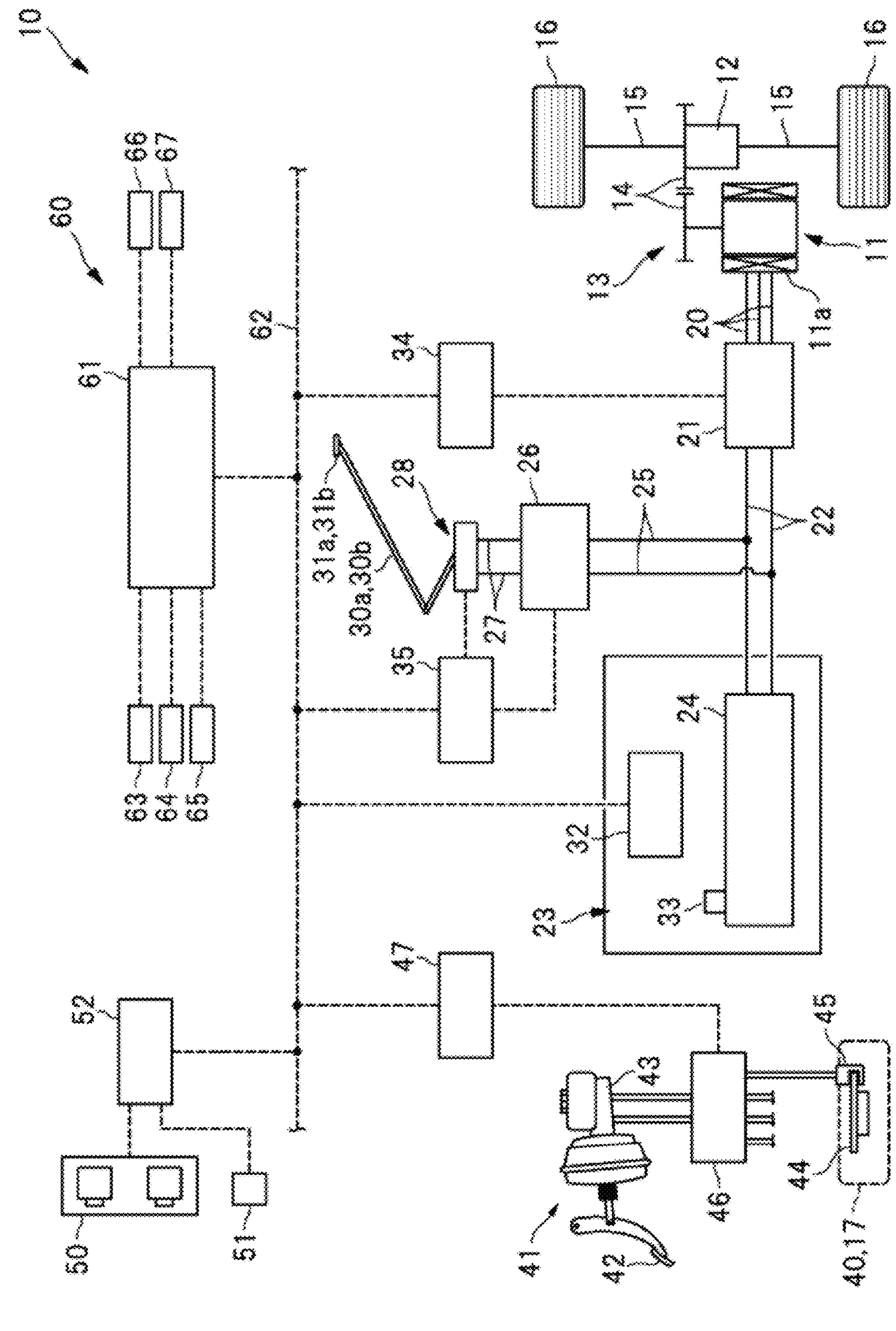

[FIG. 5]
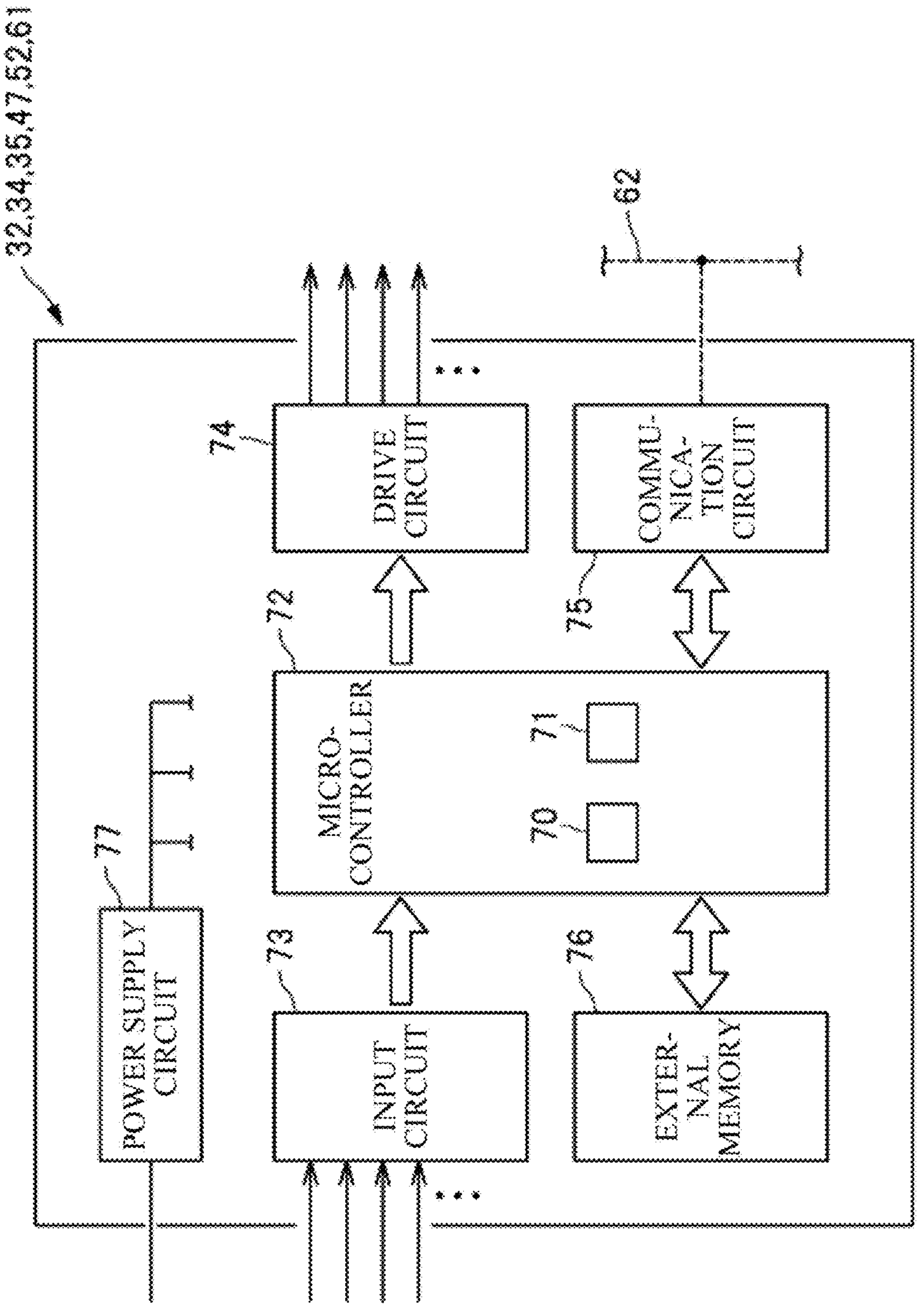

[ FIG. 6 ]
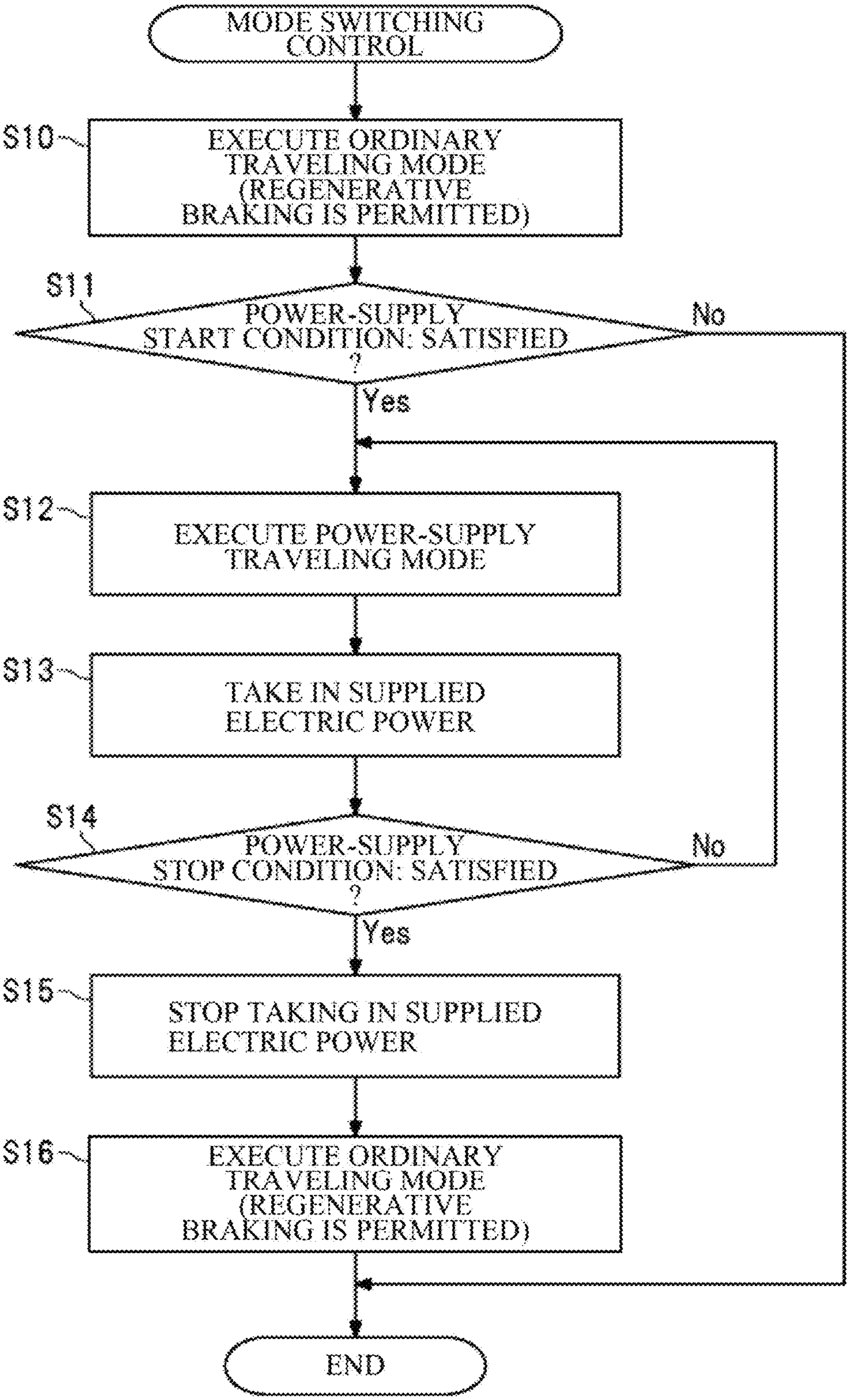

[ FIG. 7 ]
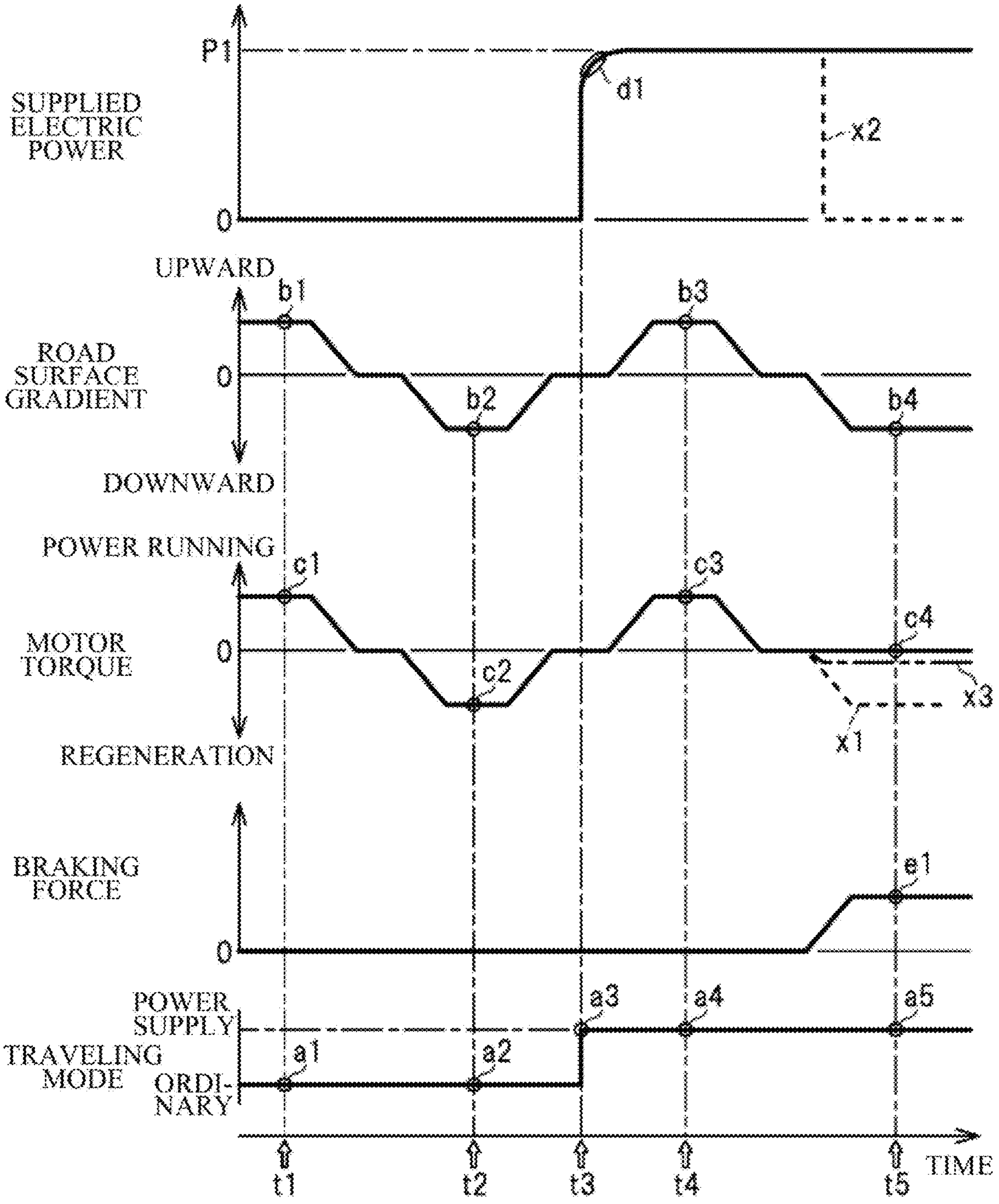

[ FIG. 8 ]
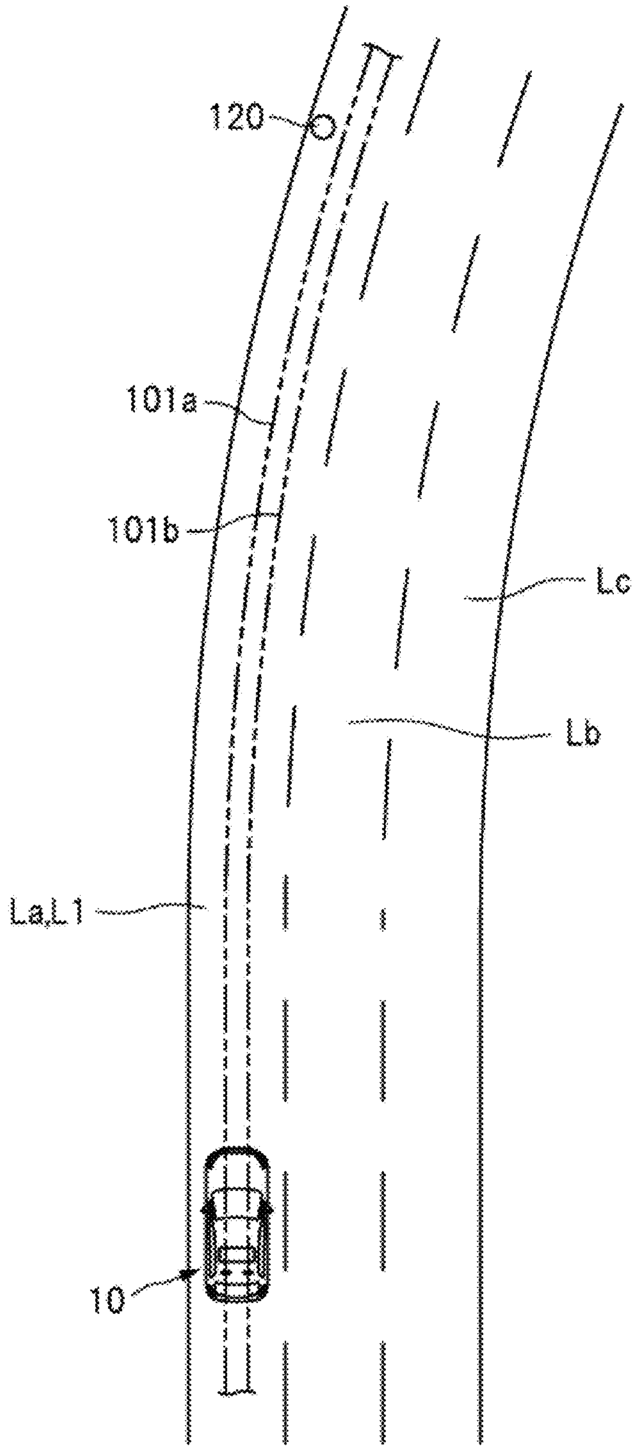

[FIG. 9]
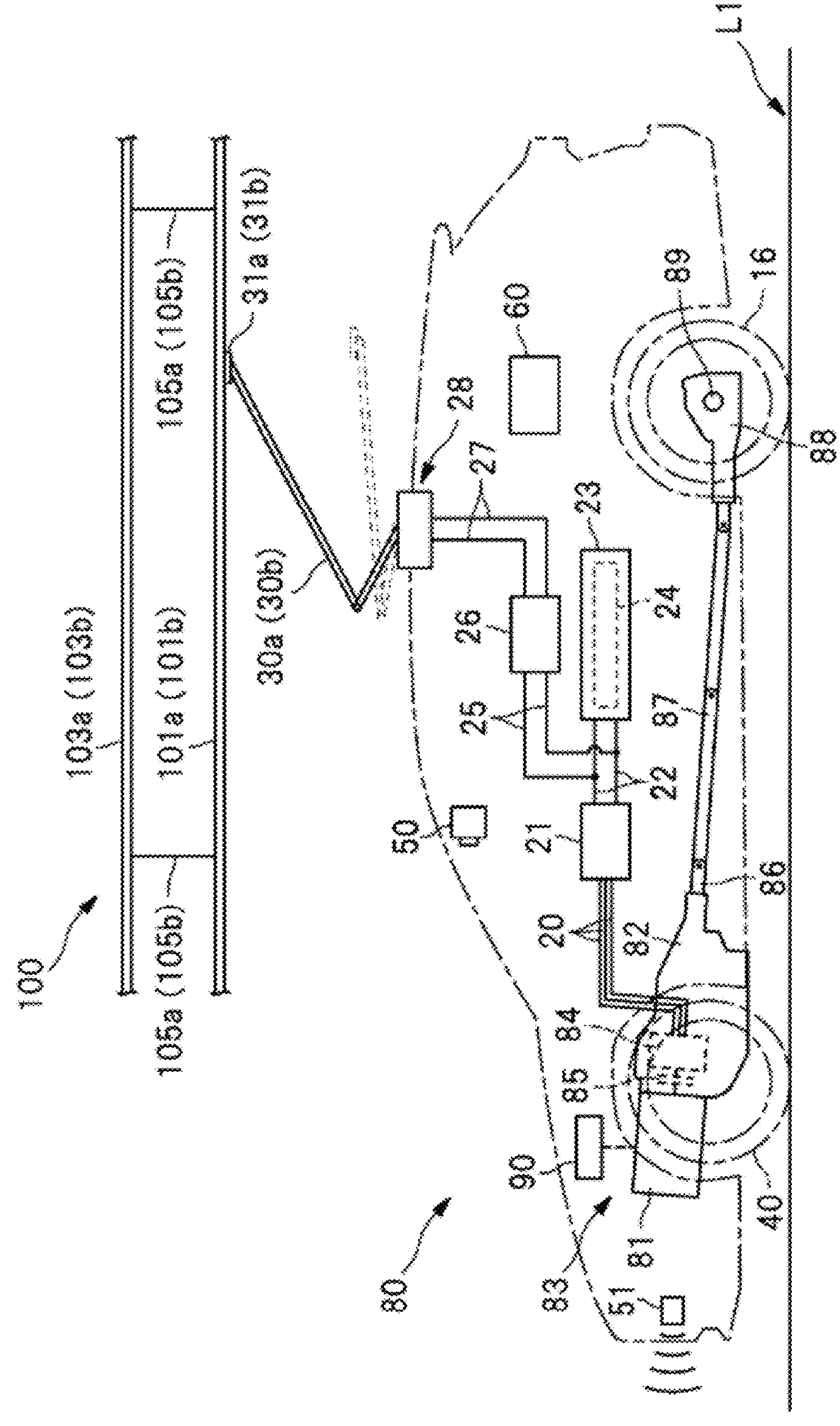

[ FIG. 10 ]
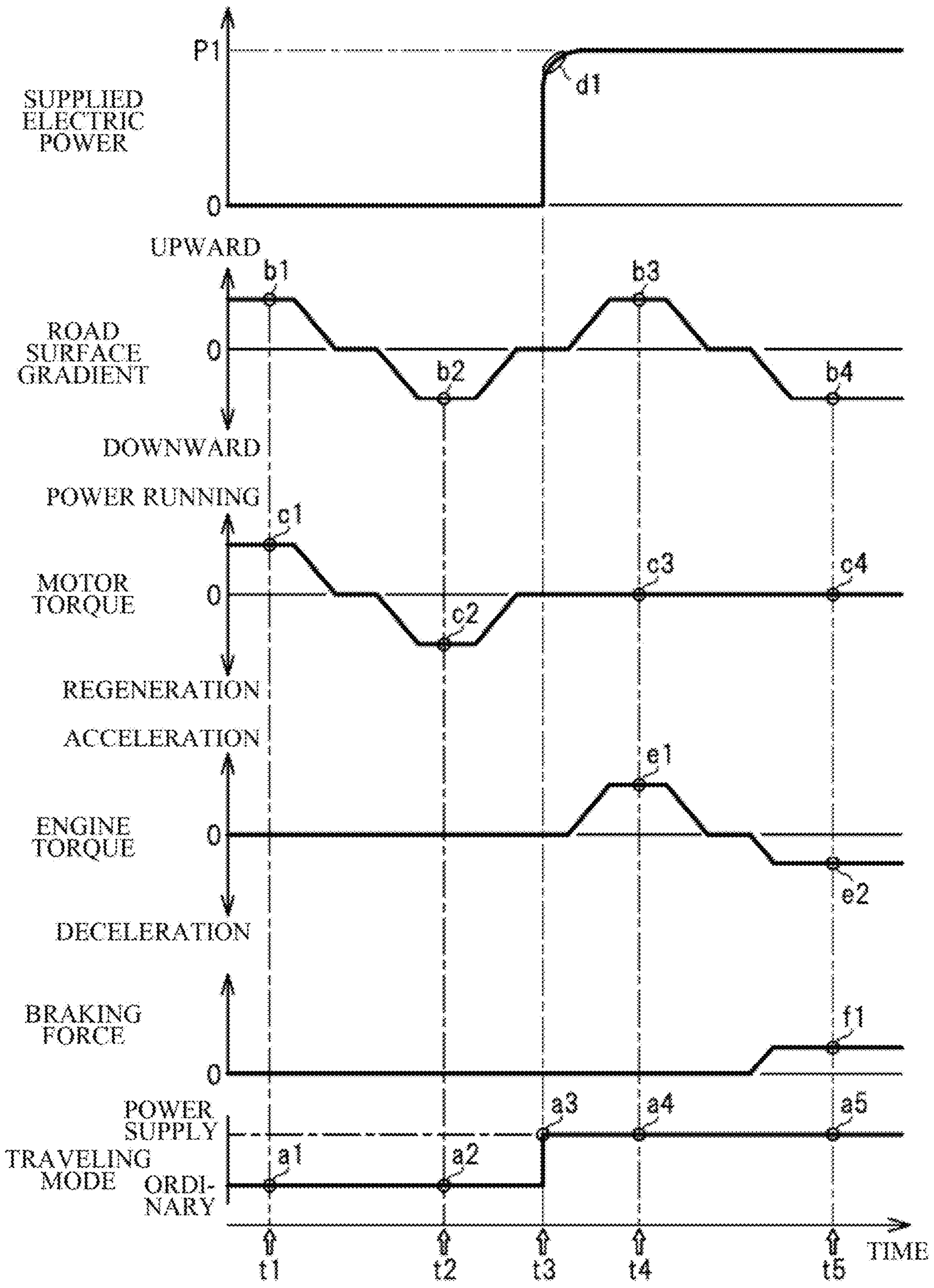

ELECTRIC VEHICLE

CROSS-REFERENCE TO RELATED APPLICATIONS

This application is the U.S. National Phase under 35 U.S.C. § 371 of International Application No. PCT/JP2023/027921, filed on Jul. 31, 2023, the entire contents of which are hereby incorporated by reference.

TECHNICAL FIELD

The disclosure relates to an electric vehicle.

BACKGROUND ART

Electric vehicles such as electric automobiles and plug-in hybrid vehicles are each equipped with a power storage body such as a lithium-ion battery. To secure a sufficient cruising distance of an electric vehicle, it is necessary to increase the capacity of a power storage body. However, such an increase in the capacity of a power storage body is a factor that increases costs of an electric vehicle.

To address this, an electric vehicle including a power receiving device such as a current collector arm or a pantograph has been developed (refer to Patent Literature 1 to 4). The electric vehicle including the power receiving device is capable of receiving electric power supply from a feeder, such as trolley line, installed on a power supply lane, such as an automobile-dedicated road, via the power receiving device. That is, the electric vehicle is allowed to travel when a power storage body is being charged, which makes it possible to reduce the capacity of the power storage body while maintaining the cruising distance.

CITATION LIST

Patent Literature

Patent Literature 1: Japanese Unexamined Patent Application Publication (Translation of PCT Application) No. 2019-506114
Patent Literature 2: International Publication No. WO 2015/146393
Patent Literature 3: Japanese Unexamined Patent Application Publication (Translation of PCT Application) No. 2016-522666
Patent Literature 4: International Publication No. WO 2011/135870

SUMMARY OF INVENTION

Problem to be Solved by the Invention

Meanwhile, the number of installation sections of power supply lanes is limited. Accordingly, in order to reduce the capacity of a power storage body while maintaining a cruising distance, it is desired to enhance efficiency of electric power supply from the power supply lanes.

Means for Solving the Problem

According to the disclosure, an electric vehicle to be supplied with electric power from an external power source during traveling includes an electric motor, a power storage body, a power receiver, a charger, and a control system. The electric motor is coupled to a wheel. The power storage body is coupled to the electric motor. The power receiver is configured to receive electric power from the external power source. The charger is coupled to the power receiver and the power storage body. The control system includes a processor and a memory that are communicatively coupled to each other. The control system is configured to control the electric motor. The electric vehicle has traveling modes including a first traveling mode and a second traveling mode. In the second traveling mode, regenerative electric power upon vehicle braking is smaller than that in the first traveling mode. The control system is configured to execute the first traveling mode in a non-power-supply time in which the charger is deactivated, and execute the second traveling mode in a power-supply time in which the charger is activated.

Effect of the Invention

According to the disclosure, it is possible to increase efficiency of electric power supply.

BRIEF DESCRIPTION OF DRAWINGS

FIG. 1 is a diagram illustrating a configuration example of an electric vehicle according to an embodiment of the disclosure.

FIG. 2 is a diagram illustrating an example of a power supply lane that is set on a road such as an automobile-dedicated road.

FIG. 3 is a diagram illustrating the electric vehicle and power supply equipment as viewed from an arrow direction III of FIG. 1.

FIG. 4 is a diagram illustrating an example of the electric vehicle and an example of a control system.

FIG. 5 is a diagram illustrating an example of a basic structure of a control unit.

FIG. 6 is a flowchart of an exemplary execution procedure of mode switching control.

FIG. 7 is a timing chart illustrating an exemplary operational state of each of various devices in the mode switching control.

FIG. 8 is a diagram illustrating an exemplary traveling state of the electric vehicle.

FIG. 9 is a diagram illustrating a configuration example of an electric vehicle according to another embodiment of the disclosure.

FIG. 10 is a timing chart illustrating an exemplary operational state of each of various devices in the mode switching control.

MODES FOR CARRYING OUT THE INVENTION

In the following, some embodiments of the invention will be described in detail with reference to the drawings. In the following description, the same or substantially the same components or configurations are denoted by the same reference numerals, and repeated descriptions thereof are omitted.

First Embodiment

<Outline of Vehicle>

FIG. 1 is a diagram illustrating a configuration example of an electric vehicle 10 according to an embodiment of the disclosure. As illustrated in FIG. 1, the electric vehicle 10 is an electric automobile and includes an electric axle 13 that includes a traveling motor 11 and a differential 12. The differential 12 is coupled to the traveling motor 11 with a gear train 14 interposed therebetween, and a rear wheel 16 is coupled to the differential 12 with an axle shaft 15 interposed therebetween. Accordingly, the traveling motor (an electric motor) 11 is coupled to the rear wheel 16.

An inverter 21 is coupled to the traveling motor 11 by means of a current supply line 20, and a battery pack 23 is coupled to the inverter 21 by means of a current supply line 22. Note that the battery pack 23 includes a battery module 24 that includes a plurality of battery cells. Further, a charger 26 is coupled to the current supply line 22 by means of a current supply line 25, and a current collecting unit 28 is coupled to the charger 26 by means of a current supply line 27. Accordingly, the battery module (a power storage body) 24 is coupled to the traveling motor 11, and the charger 26 is coupled to the current collecting unit (a power receiver) 28 and the battery module 24.

Trolley lines 101*a* and 101*b* of power supply equipment 100 installed on a power supply lane L1 of the automobile-dedicated road are located above the electric vehicle 10. In addition, the current collecting unit 28 installed on an upper portion of a vehicle body of the electric vehicle 10 has pantographs 30*a* and 30*b* that are movable up and down. As indicated by an arrow a in FIG. 1, a slider 31*a* of the pantograph 30*a* and a slider 31*b* of the pantograph 30*b* are allowed to come into contact with the trolley lines 101*a* and 101*b*, respectively, by raising the pantographs 30*a* and 30*b* of the current collecting unit 28. When the sliders 31*a* and 31*b* come into contact with the trolley lines 101*a* and 101*b*, respectively, in this manner, the battery module 24 is coupled to the trolley lines 101*a* and 101*b* with the charger 26 and the current collecting unit 28 interposed therebetween. This allows the electric vehicle 10 to receive electric power supplied from the trolley lines 101*a* and 101*b* during traveling, which makes it possible to reduce the capacity of the battery module 24 while securing a sufficient cruising distance.

<Power Supply Equipment>

FIG. 2 is a diagram illustrating an example of the power supply lane L1 that is set on the road such as the automobile-dedicated road, and FIG. 3 is a diagram illustrating the electric vehicle 10 and the power supply equipment 100 as viewed from the arrow direction III of FIG. 1.

As illustrated in FIG. 2, three traveling lanes La, Lb, and Lc are installed on the automobile-dedicated road. As indicated by hatching in FIG. 2, the power supply lane L1 including the trolley lines 101*a* and 101*b* is installed over a predetermined length of the traveling lane La. Further, as illustrated in an enlarged part, overhead line poles 102 that suspend the trolley lines 101*a* and 101*b* are installed on a road side of the power supply lane L1.

As illustrated in FIG. 3, the overhead line pole 102 of the power supply equipment 100 includes a bracket 104*a* that supports a suspension line 103 *a* on a positive electrode side, and a bracket 104*b* that supports a suspension line 103*b* on a negative electrode side. The trolley line 101*a* on the positive electrode side is suspended from the suspension line 103*a* with a hanger 105*a* interposed therebetween, and the trolley line 101*b* on the negative electrode side is suspended from the suspension line 103*b* with a hanger 105*b* interposed therebetween. A commercial power source (an external power source) 107 is coupled to the trolley lines 101*a* and 101*b* with a power supply device 106 interposed therebetween. The power supply device 106 incorporates an AC/DC converter 108 and the like. The power supply device 106 converts AC power from the commercial power source 107 into DC power and supplies the DC power to the trolley lines 101*a* and 101*b*.

<Configuration of Vehicle>

FIG. 4 is a diagram illustrating an example of the electric vehicle 10 and an example of a control system 60. As described above, the battery pack 23 is coupled to the traveling motor 11 with the inverter 21 interposed therebetween. In addition, the current collecting unit 28 is coupled to the current supply line 22 with the charger 26 interposed therebetween. The current supply line 22 couples the battery pack 23 and the inverter 21. The charger 26 is a power convertor. The battery pack 23 includes the battery module 24 that includes the plurality of battery cells, and the battery control unit 32 that monitors charging and discharging of the battery module 24. Further, the battery pack 23 includes a battery sensor 33 that detects a charge current, a discharge current, a terminal voltage, and the like. The battery control unit 32 is an electronic control unit and has a capability of calculating a state of charge (SOC) that is a charge state of the battery module 24, based on the charge current, the discharge current, the terminal voltage, and the like detected by the battery sensor 33.

A motor control unit 34 is an electronic control unit and coupled to the inverter 21 that mutually converts DC power and AC power. The motor control unit 34 controls an energization state of the traveling motor 11 by controlling the inverter 21 that includes switching elements or the like, to thereby control motor torque (power running torque and regenerative torque). When the traveling motor 11 is controlled to a power running state, electric power is supplied from the battery module 24 to a stator 11*a* via the inverter 21. In contrast, when the traveling motor 11 is controlled to a regenerative state, that is, a power generation state, electric power is supplied from the stator 11*a* to the battery module 24 via the inverter 21.

A power supply control unit 35 is an electronic control unit and coupled to the charger 26 and the current collecting unit 28. The power supply control unit 35 controls raising and lowering of the pantographs 30*a* and 30*b* by controlling the current collecting unit 28. Further, the power supply control unit 35 controls the charger 26 that includes a DC/DC converter and the like, to thereby step down the DC power received from the trolley lines 101*a* and 101*b* and supply the stepped-down DC power to the battery module 24. Note that electric power may be supplied not only from the charger 26 to the battery module 24 but also from the charger 26 to the traveling motor 11 via the inverter 21.

The electric vehicle 10 includes a brake device (a friction brake) 41 braking front wheels 40 and rear wheels 16. The brake device 41 includes a master cylinder 43 outputting a brake fluid pressure in conjunction with a brake pedal 42, a caliper 45 braking disk rotors 44 of the front wheels 40 and the rear wheels 16, and a brake actuator 46 adjusting the brake fluid pressure of each caliper 45. The brake actuator 46 includes a non-illustrated electric pump, a non-illustrated accumulator, a non-illustrated electromagnetic valve, and the like to adjust the brake fluid pressure. A brake control unit 47 is an electronic control unit and coupled to the brake actuator 46.

The electric vehicle 10 includes a front camera 50 that captures an image of a front area ahead of the vehicle, and a front radar 51 that detects a distance to an object located in the front area ahead of the vehicle. A driving control unit 52 is an electronic control unit and coupled to the front camera 50 and the front radar 51. The driving control unit 52 controls the traveling motor 11, the brake actuator 46, and the like, based on data such as the image data from the front camera 50 and the distance data from the front radar 51, to thereby execute control such as automated driving control on the power supply lane L1. Note that the automated driving control executed by the driving control unit 52 includes driving assistance control in which a part of a driving operation is automatically performed. Examples of the driving assistance control include adaptive cruise control in which acceleration traveling or deceleration traveling is performed with following a preceding vehicle, lane keeping control in which wheels are steered so as not to deviate from a traveling lane, and automated brake control in which brakes are applied to wheels when approaching another vehicle or the like.

<Control System>

To control the electric axle 13, the charger 26, the brake device 41, and the like, the electric vehicle 10 includes the control system 60 that includes electronic control units. Examples of the electronic control units of the control system 60 include the battery control unit 32, the motor control unit 34, the power supply control unit 35, the brake control unit 47, and the driving control unit 52 described above. Examples of the electronic control units of the control system 60 further include an integrated control unit 61 that outputs a control signal to each of the control units 32, 34, 35, 47, and 52. These control units 32, 34, 35, 47, 52, and 61 are communicably coupled to each other via a communication network 62 such as a controller area network (CAN). The integrated control unit 61 sets operation targets of the electric axle 13, the charger 26, the brake device 41, and the like, based on input data from the various control units 32, 34, 35, 47, and 52 and various sensors to be described later. Thereafter, the integrated control unit 61 generates control respective signals corresponding to the operation targets of the electric axle 13, the charger 26, the brake device 41, and the like, and these control signals are outputted to the various control units 32, 34, 35, 47, and 52.

Examples of the sensors coupled to the integrated control unit 61 include an accelerator sensor 63 that detects an operational state of an accelerator pedal, and a brake sensor 64 that detects an operational state of the brake pedal 42. Examples of the sensors coupled to the integrated control unit 61 further include a vehicle speed sensor 65 that detects a vehicle speed that is a traveling speed of the electric vehicle 10, and a gradient sensor 66 that detects a gradient of the traveling road surface. Note that a start switch 67 is coupled to the integrated control unit 61, and the control system 60 is started up by manually operating the start switch 67.

FIG. 5 is a diagram illustrating an example of a basic configuration of each of the control units 32, 34, 35, 47, 52, and 61. The control units 32, 34, 35, 47, 52, and 61 are electronic control units, and each include a microcontroller 72 in which a processor 70, a main memory (a memory) 71, and the like are incorporated, as illustrated in FIG. 5. A predetermined program is held in the main memory 71, and the program is executed by the processor 70. The processor 70 and the main memory 71 are communicably coupled to each other. Note that a plurality of processors 70 may be incorporated in the microcontroller 72, or a plurality of main memories 71 may be incorporated in the microcontroller 72.

The control units 32, 34, 35, 47, 52, and 61 each include an input circuit 73, a drive circuit 74, a communication circuit 75, an external memory 76, and a power supply circuit 77. The input circuit 73 converts signals received from the various sensors into signals receivable by the microcontroller 72. Based on the signals outputted from the microcontroller 72, the drive circuit 74 generates drive signals for various devices such as the inverter 21 and the charger 26 described above. The communication circuit 75 converts the signals outputted from the microcontroller 72 into communication signals directed to the other control units. The communication circuit 75 converts the communication signals received from the other control units into signals receivable by the microcontroller 72. Further, the power supply circuit 77 supplies a stable power supply voltage to the microcontroller 72, the input circuit 73, the drive circuit 74, the communication circuit 75, the external memory 76, and the like. The external memory 76 includes a nonvolatile memory or the like, and holds programs, various kinds of data, and the like.

<Mode Switching Control: Flowchart>

Next, a description will be given of mode switching control in which traveling modes of the electric vehicle 10 are switched. FIG. 6 is a flowchart of an exemplary execution procedure for the mode switching control. Each step of the mode switching control illustrated in FIG. 6 is a step to be executed by the processor 70 of the control system 60. In addition, the mode switching control illustrated in FIG. 6 is control to be executed by the control system 60 at predetermined intervals after the control system 60 is started up by a start switch operation.

As the traveling modes, the electric vehicle 10 has an ordinary traveling mode (a first traveling mode) to be executed in a non-power-supply time in which electric power is not supplied from the trolley lines 101*a* and 101*b*, and a power-supply traveling mode (a second traveling mode) to be executed in a power-supply time in which electric power is supplied from the trolley lines 101*a* and 101*b*. The ordinary traveling mode of the electric vehicle 10 is a traveling mode in which regenerative braking of the traveling motor 11 is permitted, and the power-supply traveling mode of the electric vehicle 10 is a traveling mode in which regenerative braking of the traveling motor 11 is prohibited. In other words, the power-supply traveling mode is a traveling mode in which regenerative electric power upon vehicle braking is controlled to zero, and a traveling mode in which regenerative electric power upon vehicle braking is smaller than that in the ordinary traveling mode.

As illustrated in FIG. 5, the control system 60 proceeds to Step S10 to execute the ordinary traveling mode in which the regenerative braking of the traveling motor 11 is permitted. Next, the control system 60 proceeds to Step S11 to determine whether a predetermined power-supply start condition is satisfied. Here, the power-supply start condition refers to a condition for starting electric power supply from the trolley lines 101*a* and 101*b* to the electric vehicle 10. For example, the predetermined power-supply start condition is a condition that the electric vehicle 10 is traveling on the power supply lane L1 and that the SOC of the battery module 24 is less than a predetermined threshold.

When determining in Step S11 that the power-supply start condition is satisfied, the control system 60 proceeds to Step S12 to execute the power-supply traveling mode in which the regenerative braking of the traveling motor 11 is prohibited. Thereafter, the control system 60 proceeds to Step S13 to start taking in the electric power (hereinafter referred to as supplied electric power) supplied from the trolley lines 101*a* and 101*b* to the electric vehicle 10 by raising the pantographs 30*a* and 30*b* and thereby activating the charger 26. Further, in the power-supply traveling mode, the control system 60 controls the traveling motor 11 and the brake device 41, to thereby control the vehicle speed of the electric vehicle 10 so that the electric vehicle 10 maintains a predetermined target vehicle speed.

Next, the control system 60 proceeds to Step S14 to determine whether a predetermined power-supply stop condition is satisfied. Here, the power-supply stop condition refers to a condition for stopping the electric power supply from the trolley lines 101*a* and 101*b* to the electric vehicle 10. For example, the power-supply stop condition is a condition that the electric vehicle 10 is not traveling on the power supply lane L1 or a condition that the SOC of the battery module 24 is greater than the predetermined threshold value.

When determining in Step S14 that the power-supply stop condition is not satisfied, the control system 60 proceeds to Step S12 to continue the power-supply traveling mode, and proceeds to Step S13 to continue taking in the supplied electric power. In contrast, when determining in Step S14 that the power-supply stop condition is satisfied, the control system 60 proceeds to Step S15 to deactivate the charger 26 and lower the pantographs 30*a* and 30*b* to thereby stop taking in the supplied electric power. Thereafter, the control system 60 proceeds to Step S16 to execute the ordinary traveling mode in which the regenerative braking of the traveling motor 11 is permitted.

<Mode Switching Control: Timing Chart>

FIG. 7 is a timing chart of an exemplary operational state of each of various devices in the mode switching control. Note that illustrated in FIG. 7 is a state where the vehicle speed of the electric vehicle 10 is kept constant. As indicated in a time t1 illustrated in FIG. 7, when the traveling road surface has an upward gradient (reference sign b1) in the ordinary traveling mode in which the supplied electric power is not taken in (reference sign a1), the traveling motor 11 is controlled to the power running state (reference sign c1). Further, as indicated in a time t2, when the traveling road surface has a downward gradient (reference sign b2) in the ordinary traveling mode in which the supplied electric power is not taken in (reference sign a2), the traveling motor 11 is controlled to the regenerative state (reference sign c2).

Thereafter, as indicated in a time t3, when the electric vehicle 10 has entered the power supply lane L1 and the power-supply start condition is satisfied, the traveling mode is switched from the ordinary traveling mode to the power-supply traveling mode (reference sign a3), and the charger 26 is activated to increase the supplied electric power to predetermined target electric power P1 (reference sign d1). Further, as indicated in a time t4, when the traveling road surface has an upward gradient (reference sign b3) in the power-supply traveling mode in which the supplied electric power is taken in (reference sign a4), the traveling motor 11 is controlled to the power running state (reference sign c3). Further, as indicated in a time t5, when the traveling road surface has a downward gradient (reference sign b4) in the power-supply traveling mode in which the supplied electric power is taken in (reference sign a5), a braking force of the brake device 41 is increased (reference sign e1) without controlling the traveling motor 11 to the regenerative state (reference sign c4).

As indicated in the time t5 in FIG. 7, when the electric vehicle 10 travels on a downward gradient with the target vehicle speed maintained, in the power-supply traveling mode in which the supplied electric power is taken in, brakes are to be applied to the electric vehicle 10 in order to suppress an increase in the vehicle speed. Here, as described above, when the electric vehicle 10 travels on the downward gradient in the power-supply traveling mode, the control system 60 increases the braking force of the brake device 41 without controlling the traveling motor 11 to the regenerative state. That is, the control system 60 activates the brake device 41 without causing the traveling motor 11 to perform the regenerative braking upon vehicle braking in the power-supply traveling mode. Accordingly, it is possible to increase the efficiency of the electric power supply from the trolley lines 101*a* and 101*b* to the electric vehicle 10 by restricting the regenerative electric power of the traveling motor 11 as described above.

That is, when the traveling motor 11 is caused to perform the regenerative braking upon vehicle braking in the power-supply traveling mode as indicated by a broken line x1 in FIG. 7, the battery module 24 is supplied with not only the supplied electric power but also the regenerative electric power. At this time, the regenerative electric power is unable to be taken into the battery module 24, depending on an output characteristic of the battery module 24. This may possibly interrupt the supplied electric power as illustrated by a broken line x2. Such an interruption of the supplied electric power is a factor that lowers the efficiency of the electric power supply; therefore, the supply of the supplied electric power is maintained and the efficiency of the electric power supply is enhanced by restricting the regenerative braking of the traveling motor 11.

In the above description, the regenerative braking of the traveling motor 11 is prohibited upon vehicle braking in the power-supply traveling mode; however, this is non-limiting. For example, as illustrated by a two-dot chain line x3 in FIG. 7, the traveling motor 11 may be caused to perform the regenerative braking to such an extent that the supplied electric power taken into the battery module 24 will not be thereby affected. Accordingly, even when the regenerative braking is permitted in the power-supply traveling mode, the regenerative electric power generated in the power-supply traveling mode is smaller than the regenerative electric power generated in the ordinary traveling mode under the condition that target braking force of the electric vehicle 10 is the same.

<Power-Supply Traveling Mode>

In the above description, the control system 60 that executes the power-supply traveling mode controls the traveling motor 11 and the brake device 41 so that the target vehicle speed is maintained; however, this is non-limiting. For example, when a preceding vehicle 110 is present as illustrated in FIG. 1, the control system 60 controls the traveling motor 11 and the brake device 41 so that a constant inter-vehicular distance D1 is maintained with respect to the preceding vehicle 110. This makes it possible to avoid excessive deceleration of the electric vehicle 10 even when the preceding vehicle 110 is suddenly decelerated. Accordingly, it is possible to enhance the efficiency of the electric power supply by preventing the traveling motor 11 from performing the regenerative braking.

FIG. 8 is a diagram illustrating an exemplary traveling state of the electric vehicle 10. As illustrated in FIG. 8, the power supply lane L1 may be installed in a bent manner. In this case, the control system 60 may determine a curvature of the power supply lane L1 based on the image data from the front camera 50, and may control the brake device 41 based on the curvature of the power supply lane L1. For example, when determining that the curvature of the power supply lane L1 located in front of the vehicle is large, the control system 60 activates the brake device 41 in advance to reduce the vehicle speed. Such feed-forward control of the brake device 41 makes it possible to avoid excessive deceleration of the electric vehicle 10 even when the electric vehicle 10 transits from straight traveling to turning traveling. It is therefore possible to enhance the efficiency of the electric power supply by preventing the traveling motor 11 from performing the regenerative braking.

The control system 60 may determine a road surface gradient in front of the vehicle based on the image data from the front camera 50, and may control the brake device 41 based on the road surface gradient thus determined. For example, when determining that the power supply lane L1 located in front of the vehicle has a large downward gradient, the control system 60 activates the brake device 41 in advance to reduce the vehicle speed. Such feed-forward control of the brake device 41 makes it possible to avoid excessive deceleration of the electric vehicle 10 even when the electric vehicle 10 transits to traveling on the downward gradient. It is therefore possible to enhance the efficiency of the electric power supply by preventing the traveling motor 11 from performing the regenerative braking.

The control system 60 controls a steering motor provided in a non-illustrated steering mechanism so that the electric vehicle 10 travels in substantially the middle of the power supply lane L1. This makes it possible to appropriately maintain a condition in which the pantographs 30*a* and 30*b* are in contact with the trolley lines 101*a* and 101*b*, respectively. From such a viewpoint as well, it is possible to enhance the efficiency of the electric power supply. Further, when detecting an obstacle 120 present in front of the vehicle, the control system 60 activates the brake device 41 in advance to reduce the vehicle speed. Such feed-forward control of the brake device 41 makes it possible to avoid excessive deceleration of the electric vehicle 10 even when the electric vehicle 10 avoids the obstacle 120. It is therefore possible to enhance the efficiency of the electric power supply by preventing the traveling motor 11 from performing the regenerative braking.

Second Embodiment

In the example illustrated in FIG. 1, an electric automobile is used as the electric vehicle 10; however, this is non-limiting. Alternatively, a hybrid vehicle may be used as an electric vehicle 80. Here, FIG. 9 is a diagram illustrating a configuration example of the electric vehicle 80 according to another embodiment of the disclosure. Note that in FIG. 9, components similar to those illustrated in FIG. 1 are denoted by the same reference numerals, and descriptions thereof are omitted.

As illustrated in FIG. 9, the electric vehicle 80 is a hybrid vehicle and includes a power unit 83 that includes an engine 81 and a transmission 82. The transmission 82 incorporates a traveling motor 84. Between the engine 81 and the traveling motor 84, a clutch 85 is provided. Further, the rear wheel 16 is coupled to an output shaft 86 of the transmission 82 with a propeller shaft 87, a differential 88, and an axle shaft 89 interposed therebetween. Accordingly, the engine 81 is coupled to the rear wheel 16, and the traveling motor (an electric motor) 84 is coupled to the rear wheel 16.

The inverter 21 is coupled to the traveling motor 84 by means of the current supply line 20, and the battery pack 23 is coupled to the inverter 21 by means of the current supply line 22. Further, the charger 26 is coupled to the current supply line 22 by means of the current supply line 25, and the current collecting unit 28 is coupled to the charger 26 by means of the current supply line 27. Accordingly, the battery module (the power storage body) 24 is coupled to the traveling motor 84, and the charger 26 is coupled to the current collecting unit (the power receiver) 28 and the battery module 24.

Further, an engine control unit 90 is coupled to the engine 81 of the power unit 83. The engine control unit 90 is a part of the control system 60. The engine control unit 90 is an electronic control unit and outputs control signals to a non-illustrated throttle valve, a non-illustrated injector, a non-illustrated ignition coil, and the like, to thereby control engine torque to an acceleration side or a deceleration side. That is, the engine control unit 90 is configured to control the engine torque on the deceleration side, i.e., engine braking, by controlling the throttle valve to a closed side and shutting off fuel injection of the injector.

<Mode Switching Control: Timing Chart>

FIG. 10 is a timing chart of an exemplary operational state of each of various devices in the mode switching control. Note that illustrated in FIG. 10 is a state where the vehicle speed of the electric vehicle 80 is kept constant, as in FIG. 7.

As indicated in a time t1 illustrated in FIG. 10, when the traveling road surface has an upward gradient (reference sign b1) in the ordinary traveling mode in which the supplied electric power is not taken in (reference sign a1), the traveling motor 84 is controlled to the power running state (reference sign c1). Further, as indicated in a time t2, when the traveling road surface has a downward gradient (reference sign b2) in the ordinary traveling mode in which the supplied electric power is not taken in (reference sign a2), the traveling motor 84 is controlled to the regenerative state (reference sign c2). Note that, when the SOC of the battery module 24 is greater than a predetermined lower limit value in the ordinary traveling mode, the engine 81 is maintained in a stopped state from a viewpoint of enhancing fuel efficiency.

Thereafter, as indicated in a time t3, when the electric vehicle 80 has entered the power supply lane L1 and the power-supply start condition is satisfied, the traveling mode is switched from the ordinary traveling mode to the power-supply traveling mode (reference sign a3), and the charger 26 is activated to increase the supplied electric power to the predetermined target electric power P1 (reference sign d1). Further, as indicated in a time t4, when the traveling road surface has an upward gradient (reference sign b3) in the power-supply traveling mode in which the supplied electric power is taken in (reference sign a4), the engine torque is controlled to the acceleration side (reference sign e1), and the motor torque of the traveling motor 84 is controlled to zero (reference sign c3). Further, as indicated in time t5, when the traveling road surface has a downward gradient (reference sign b4) in the power-supply traveling mode in which the supplied electric power is taken in (reference sign a5), engine braking is generated (reference sign e2) without controlling the traveling motor 84 to the regenerative state (reference sign c4), and the braking force of the brake device 41 is increased (reference sign f1).

As indicated in the time t5 in FIG. 10, when the electric vehicle 80 travels on a downward gradient with the target vehicle speed maintained in the power-supply traveling mode in which the supplied electric power is taken, brakes are to be applied to the electric vehicle 80 in order to suppress an increase in the vehicle speed. Here, as described above, when the electric vehicle 80 travels on the downward gradient in the power-supply traveling mode, the control system 60 generates engine braking and increases the braking force of the brake device 41 without controlling the traveling motor 84 to the regenerative state. That is, the control system 60 activates engine braking and the brake device 41 without causing the traveling motor 84 to perform the regenerative braking upon vehicle braking in the power-supply traveling mode. Accordingly, it is possible to increase the efficiency of the electric power supply from the trolley lines 101*a* and 101*b* to the electric vehicle 80 by restricting the regenerative electric power of the traveling motor 84 upon vehicle braking, in a similar manner to the electric vehicle 10 described above.

Further, as indicated in the time t4, when traveling on an upward gradient with the target vehicle speed maintained in the power-supply traveling mode in which the supplied electric power is taken in, the electric vehicle 80 is to be accelerated in order to suppress a decrease in the vehicle speed. Here, as described above, when traveling on the upward gradient in the power-supply traveling mode, the control system 60 generates the engine torque on the acceleration side without controlling the traveling motor 84 to the power running state. Controlling the motor torque of the traveling motor 84 to zero as described above makes it possible to controllably separate the traveling motor 84 from the battery module 24 and the charger 26. From such a viewpoint as well, it is possible to enhance the efficiency of the electric power supply from the trolley lines 101*a* and 101*b* to the electric vehicle 80.

Note that in the example illustrated in FIG. 10, the regenerative braking of the traveling motor 84 is prohibited upon vehicle braking in the power-supply traveling mode; however, this is non-limiting. For example, the traveling motor 84 may be caused to perform the regenerative braking to such an extent that the supplied electric power taken into the battery module 24 will not be thereby affected. Accordingly, even when the regenerative braking is permitted in the power-supply traveling mode, the regenerative electric power generated in the power-supply traveling mode is smaller than the regenerative electric power generated in the ordinary traveling mode under the condition that the target braking force of the electric vehicle 80 is the same. Further, in the example illustrated in FIG. 10, the motor torque of the traveling motor 84 is controlled to zero at the time of vehicle acceleration in the power-supply traveling mode; however, this is non-limiting. For example, the traveling motor 84 may be controlled to the power running state at the time of vehicle acceleration in the power-supply traveling mode.

Other Embodiments

It is needless to say that the disclosure is not limited to the above-described embodiments and may be modified in various ways in a range not departing from the gist thereof. For example, in the above description, the control system 60 includes the six control units 32, 34, 35, 47, 52, and 61; however, this is non-limiting. For example, the control system 60 may include a single control unit, or the control system 60 may include a plurality of control units. Further, the electric vehicles 10 and 80 illustrated in the drawings are electric vehicles driven by their rear wheels; however, this is non-limiting. The electric vehicles 10 and 80 may be electric vehicles driven by their front wheels or electric vehicles driven by all of the wheels. Further, the electric vehicle 80 illustrated in the drawing is a parallel hybrid vehicle; however, this is non-limiting. The electric vehicle 80 may be a series hybrid vehicle or a series-parallel hybrid vehicle.

In the above description, the trolley lines 101*a* and 101*b* are disposed above the vehicle; however, this is non-limiting. The trolley lines may be disposed on a side of the vehicle or below the vehicle. For example, in a case where the trolley lines are installed on a guard rail or the like on the side of the vehicle, current collector arms extending laterally with respect to the electric vehicle are provided, and these current collector arms are brought into contact with the trolley lines to thereby achieve electric power supply during traveling. Further, the power supply equipment 100 illustrated in the drawings is of a contact-type or conductive power supply equipment; however, this is non-limiting. The power supply equipment 100 may be non-contact power supply equipment, that is, inductive power supply equipment. In addition, the electric vehicles 10 and 80 illustrated in the drawings receive DC power from the power supply equipment 100; however, this is non-limiting. The electric vehicles 10 and 80 may receive AC power from the power supply equipment 100.

DESCRIPTION OF REFERENCE NUMERALS

10 Electric vehicle
11 Traveling motor (Electric motor)
16 Rear wheel (Wheel)
24 Battery module (Power storage body)
26 Charger
28 Current collecting unit (Power receiver)
40 Front wheel (Wheel)
41 Brake device (Friction brake)
60 Control system
70 Processor
71 Main memory (Memory)
80 Electric vehicle
81 Engine
84 Traveling motor (Electric motor)
107 Commercial power source (External power source)

The invention claimed is:

1. An electric vehicle to be supplied with electric power from an external power source during traveling, the electric vehicle comprising:

an electric motor coupled to a wheel;

a power storage body coupled to the electric motor;

a power receiver configured to receive electric power from the external power source;

a charger coupled to the power receiver and the power storage body; and a control system comprising a processor and a memory that are communicatively coupled to each other, the control system controlling the electric motor, wherein the electric vehicle has traveling modes including a first traveling mode and a second traveling mode, wherein, when a target braking force of the electric vehicle in the first traveling mode and a target braking force of the electric vehicle in the second traveling mode are equal to each other, regenerative electric power upon vehicle braking in the second traveling mode is smaller than regenerative electric power upon vehicle braking in the first traveling mode, and the control system is configured to execute the first traveling mode in a non-power-supply time in which the charger is deactivated, and execute the second traveling mode in a power-supply time in which the charger is activated.

2. The electric vehicle according to claim 1, wherein the control system is configured to prohibit the electric motor from performing regenerative braking in the second traveling mode.

3. The electric vehicle according to claim 1, comprising a friction brake configured to brake the wheel, wherein the control system is configured to activate the friction brake upon vehicle braking in the second traveling mode.

4. The electric vehicle according to claim 3, wherein the control system is configured to, upon vehicle braking in the second traveling mode, activate the friction brake without causing the electric motor to perform regenerative braking.

5. The electric vehicle according to claim 3, further comprising a front camera configured to capture an image of an area ahead of the electric vehicle, wherein the control system is configured to determine a road surface gradient in front of the electric vehicle based on image data from the front camera, and control the friction brake based on the road surface gradient.

6. The electric vehicle according to claim 1, comprising an engine coupled to the wheel, wherein
the control system is configured to cause the engine to generate engine braking upon vehicle braking in the second traveling mode.

7. The electric vehicle according to claim 6, wherein, upon vehicle braking in the second traveling mode, the control system is configured to cause the engine to generate the engine braking without causing the electric motor to perform regenerative braking.

8. The electric vehicle according to claim 6, wherein, when the electric vehicle travels on an upward gradient in the second traveling mode, the control system is configured to generate engine torque on an acceleration side and control motor torque of the electric motor to zero.

9. The electric vehicle according to claim 1, comprising:
a friction brake configured to brake the wheel; and
an engine coupled to the wheel, wherein
the control system is configured to apply the friction brake and cause the engine to generate engine braking.

10. The electric vehicle according to claim 9, wherein the control system is configured to apply the friction brake and cause the engine to generate the engine braking without causing the electric motor to perform regenerative braking upon vehicle braking in the second traveling mode.

11. The electric vehicle according to claim 1, further comprising a friction brake configured to brake the wheel, wherein, in the second traveling mode, the control system is configured to control the electric motor and the friction brake to maintain a predetermined target vehicle speed of the electric vehicle.

12. The electric vehicle according to claim 11, wherein, when the electric vehicle travels on a downward gradient in the second traveling mode, the control system is configured to increase a braking force of the friction brake without controlling the electric motor to a regenerative state.

13. The electric vehicle according to claim 1, wherein, in the second traveling mode, the control system is configured to restrict regenerative braking of the electric motor to maintain electric power supplied from the external power source to the power storage body.

* * * * *